Aug. 9, 1932.   B. S. POLAKES   1,871,198
TIRE CHAIN
Filed Oct. 29, 1931   2 Sheets-Sheet 2
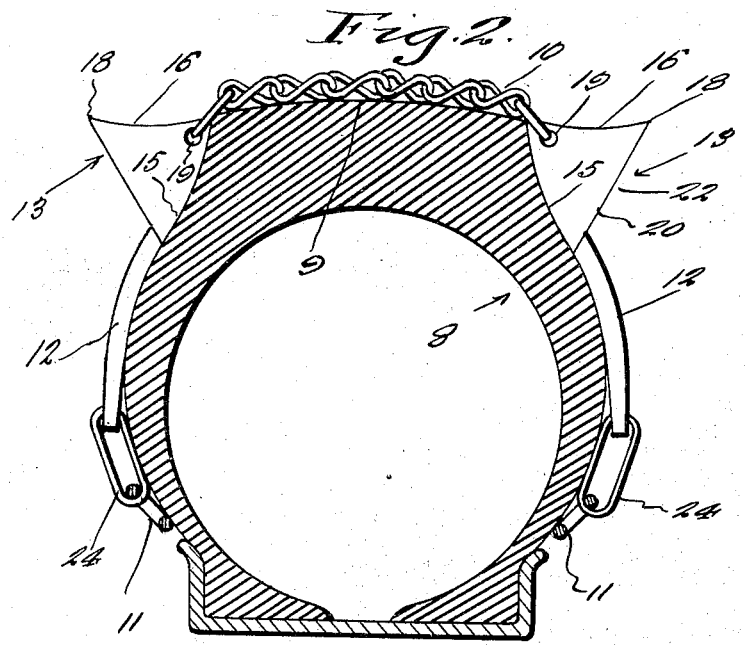
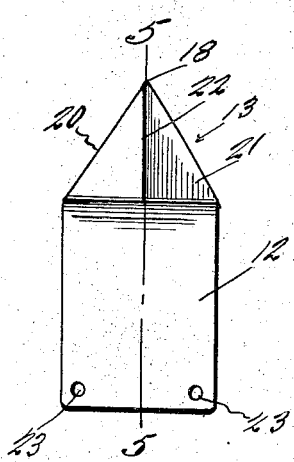
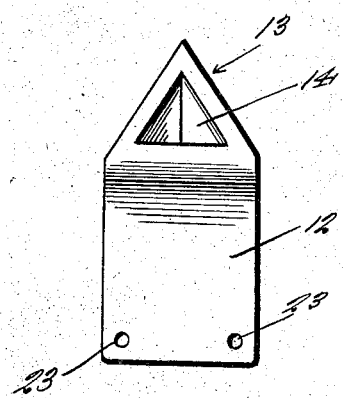
Inventor
*Bruce S. Polakes*
By *Clarence A. O'Brien*
Attorney Patented Aug. 9, 1932

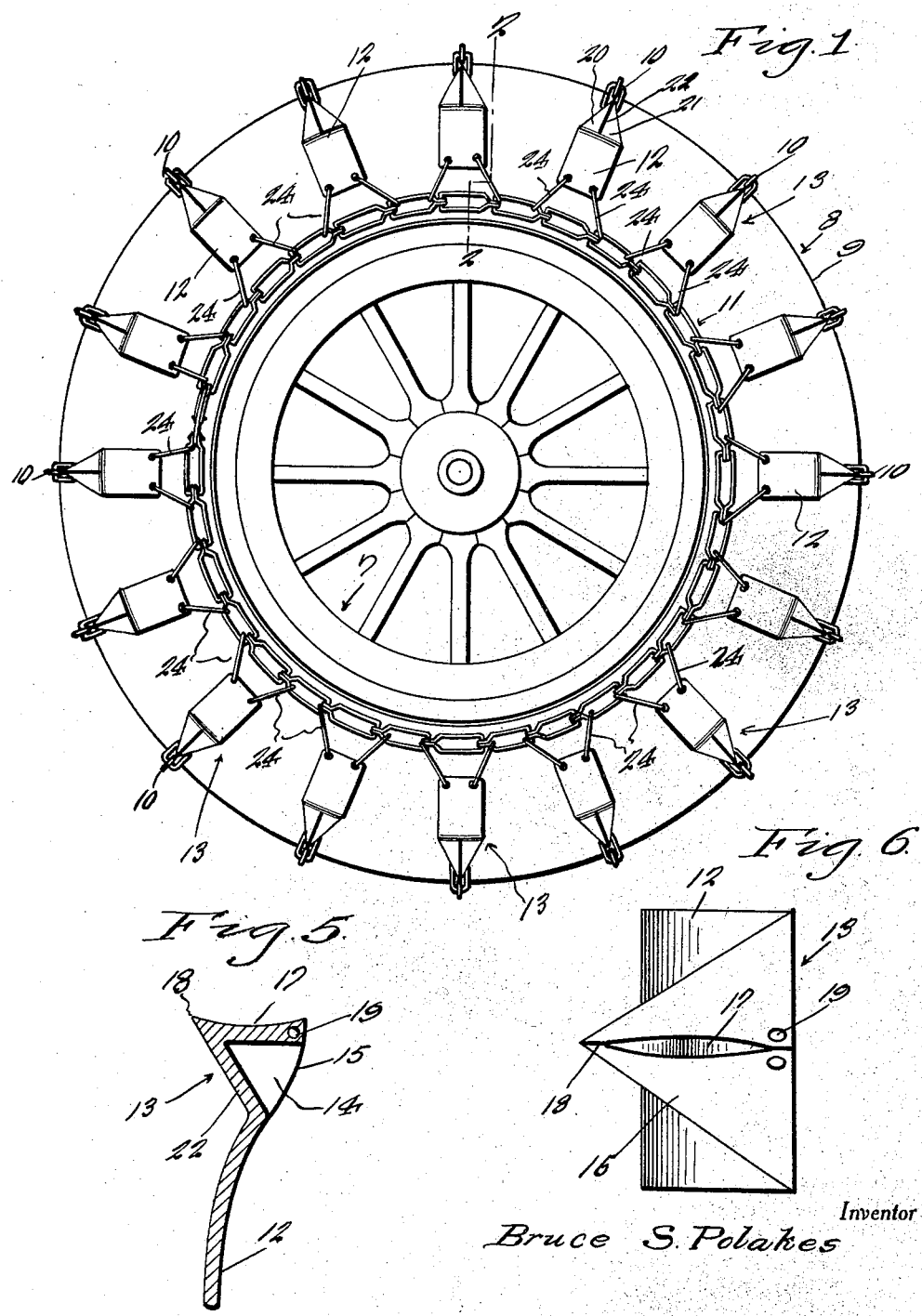

1,871,198

UNITED STATES PATENT OFFICE

BRUCE STANLEY POLAKES, OF WESTVILLE, ILLINOIS

TIRE CHAIN

Application filed October 29, 1931. Serial No. 571,903.

The present invention comprehends certain structural improvements and refinements embodied in a novel tire chain characterized as a distinctive contribution to the art owing to the embodiment therein of novel anti-slipping and traction producing means.

In its broadest aspect, novelty is predicated on the peculiar lug construction and the systematic association thereof with the tread and retaining chains, thereby producing an appreciably different anti-skid chain and lug ensemble.

More specific novelty is found in the particular construction of the lug per se, especially cast and designed to intimately cooperate with the tread of the tire and to afford a more dependable traction while at the same time minimizing frictional contact of the lug with the side walls of the tire casing.

In the drawings:

Figure 1 is a side elevational view of a pneumatic tire equipped wheel showing the improved traction chain structure applied thereto ready for operation.

Figure 2 is an enlarged transverse section on the line 2—2 of Figure 1.

Figure 3 is an outside elevational view of one of the especial anti-skid lugs.

Figure 4 is an inside face view of the same lug.

Figure 5 is a longitudinal sectional view on the line 5—5 of Figure 3.

Figure 6 is a plan view of the ground engaging surface of the lug.

In the drawings, in Figure 1, the wheel is designated by the numeral 7 and the tire by the numeral 8, the tread of the tire being indicated at 9. The tread chains which are of a length slightly greater than the width of the tread are designated by the numerals 10 while the circumferential side retaining chain is represented on each side by the numeral 11.

I provide lugs on each side of the tire and each lug is of special design so as to fulfill the requirements thereof in a satisfactory manner. Each lug is formed from a single casting which embodies a longitudinally bowed sustaining plate 12 and a peculiarly shaped laterally and outwardly projecting head 13. This head is hollow in construction and the cavity is denoted by the numeral 14. The curvate edges 15 constitute a continuation of the longitudinal curvature of the plate 12 and it is these edges 15 which bear against the adjacent curved surface of the tire casing. Otherwise stated, the edges conform in shape to that part of the casing against which they bear.

This head is substantially triangular in configuration in plan view as designated in Figure 6, and is the same in shape in side elevation as shown in Figure 2. The face 16 is the effective traction surface and the central or crest portion thereof indicated at 17 is somewhat elliptical in configuration and longitudinally dished so that by taking the section on the line 5—5 of Figure 3, said portion 17 has the longitudinal curvature represented in Figure 5.

The length of this recessed crown 17 is such that it terminates slightly short of the traction point 18, and also slightly short of the bore 19 at the opposite end which bore serves to accommodate the adjacent link or the cross chain 10. The side walls 20 and 21 as seen in Figure 3 are disposed in converging relationship and define a rib 22 of knife-like form, this rib being in alinement with the point 18.

The plate is provided with apertures 23 to accommodate links 24 connected with the circumferential side chains 11.

It is obvious that when the opposed pairs of lugs are chained in place against the tire, the cross chains 10 extend across the tread 9 while the short links 24 serve to anchor the lugs to the circumferential side chains 11. The portions of the surface of the lugs which contact the side walls of the casing conform in shape so as to snugly fit against the tire casing as depicted in Figure 2. This prevents wobbling and insures rigid maintenance.

The lugs and chains are so proportioned as to fit nicely and so as to dispose the traction surfaces 16 in substantial alinement with the tread 9 of the tire. Thus, these surfaces 16 form continuations of the tread and thereby afford more tenacious traction. Moreover, lugs of this peculiar formation serve to cut through ice and snow in such a manner as to provide the desired continuous crawl. This crawling action is sometimes referred to as "caterpillering".

Inasmuch as the construction and arrangement is clear from the drawings and description, I shall not attempt to theoretically explain the manner in which the effective traction is secured, for this action will be quite clear to persons skilled in the art to which the invention relates.

It is thought from the foregoing description that the advantages and novel features of the invention will be readily apparent. It is to be understood that changes may be made in the construction and in the combination and arrangement of the several parts provided that such changes fall within the scope of the appended claim.

I claim:

An anti-skid device for tires comprising a lug, said lug including an arcuate plate, a hollow head formed integrally with one end portion of the plate and projecting outwardly therefrom, said head being substantially triangular in top plan and including anticlinal side walls, the apex of the head having a longitudinal concavity therein, and means for mounting the lug on the tire.

In testimony whereof I affix my signature.

BRUCE S. POLAKES.